(12) United States Patent
Tomita

(10) Patent No.: US 6,779,640 B2
(45) Date of Patent: Aug. 24, 2004

(54) DRIVING FORCE TRANSMITTING CLUTCH DEVICE

(75) Inventor: Shigemitsu Tomita, Yokohama (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/461,390

(22) Filed: Jun. 16, 2003

(65) Prior Publication Data

US 2004/0040811 A1 Mar. 4, 2004

(30) Foreign Application Priority Data

Sep. 4, 2002 (JP) ........................................ 2002-258744

(51) Int. Cl.[7] .............................................. F16D 11/04
(52) U.S. Cl. ..................................... 192/24; 192/89.21
(58) Field of Search ................................. 192/24, 33 R, 192/69.2, 22, 68.8, 68.81, 68.82, 68.83, 89.21, 84.1, 90; 271/8.1

(56) References Cited

U.S. PATENT DOCUMENTS

| | | | | |
|---|---|---|---|---|
| 1,265,595 A | * | 5/1918 | Biggert | .................. 192/24 |
| 2,057,905 A | * | 10/1936 | Munschauer | .................. 192/24 |
| 4,042,088 A | * | 8/1977 | Schmohe | .................. 192/89.21 |
| 4,682,769 A | * | 7/1987 | Murakami et al. | ....... 271/10.12 |
| 5,718,313 A | * | 2/1998 | Sekine | .................. 192/24 |

FOREIGN PATENT DOCUMENTS

| | | | |
|---|---|---|---|
| JP | 52-72049 A | * | 6/1977 |
| JP | 6-66328 | | 3/1994 |
| JP | 11-5335 | | 1/1999 |

* cited by examiner

Primary Examiner—Rodney H. Bonck

(57) ABSTRACT

A driving force transmitting clutch device includes a main shaft; a first rotor rotatable around the main shaft; a second rotor rotatable around the main shaft; an inner sleeve member attached to the second rotor for engaging the first rotor, and being movable in an axial direction of the main shaft; an outer sleeve member for receiving the inner sleeve member therein; and a coil spring for urging the inner sleeve member in a direction that the inner sleeve member engages the first rotor and the outer sleeve. When a movement of the outer sleeve is stopped, the outer sleeve moves the inner sleeve for releasing the inner sleeve from the first rotor and for releasing the inner sleeve from the outer sleeve.

7 Claims, 16 Drawing Sheets

DRIVING FORCE TRANSMITTING CLUTCH DEVICE

BACKGROUND OF THE INVENTION AND RELATED ART STATEMENT

The invention relates to an improvement of a clutch device disposed between a gear of a member to be transmitted (hereinafter referred to as "transmitted member") and a gear of a driving motor to transmit a driving force. The clutch device transmits the driving force to a member such as a sheet feeding roller in a copying machine, facsimile, printer and the like only when it is necessary.

As a clutch device used for transmitting the driving force to a sheet feeding roller in a copying machine and the like, there has been known a clutch device disclosed in Japanese Patent Publication (TOKKAI) No. 06-66328.

The clutch device includes a clutch hub as an input side, a driven pulley as an output side, a coil spring and a ratchet member. The coil spring is disposed for fastening a part of the clutch hub and a part of the driven pulley. One end of the coil spring is fixed to the driven pulley and the other end thereof is fixed to the ratchet member.

In a state that the ratchet member is free to rotate, the driven pulley rotates along with the clutch hub through fastening of the coil spring. Thus, the driving force is transmitted from the input side to the output side.

On the other hand, in a state that the ratchet member is locked, the coil spring expands. As a result, the clutch hub becomes idle and the driven pulley does not rotate.

In other words, according to the clutch device as described above, the driving force of the input side is transmitted to the output side only when it is necessary. In the case of the sheet feeding roller, for example, only when it is necessary to feed a sheet, the sheet feeding roller rotates.

However, in the conventional clutch device, the driving force is transmitted through the tightening force of the coil spring, i.e. frictional force. Therefore, it is difficult to transmit the driving force without loss. In other words, slipping occurs between the coil spring and a part of the clutch hub and a part of the driven pulley tightened by the coil spring when the driving force is transmitted, thereby causing loss of the driving force. To minimize the slippage as described above, it is necessary to use extra labor to assemble the device. Also, as a running torque on the input side becomes large, the slippage easily occurs. Therefore, the conventional clutch device is not suitable for transmitting the large torque.

When the driving force is not transmitted, the clutch hub is idle in a state that a part of the clutch hub is positioned inside the coil spring. Thus, a certain amount of a frictional force is produced between the coil spring and the clutch hub even when the driving force is not transmitted. The frictional force as described above provides an unnecessary load to the driving motor that always drives the clutch hub.

In a copying machine, it is required to reduce the electric power consumption as little as possible. Accordingly, there is a trend of using a single driving motor for driving components in the copying machine to reduce the unnecessary load to the driving motor as little as possible.

In view of the above defects, an object of the present invention is to provide a clutch device for transmitting the driving force to a transmitted member, such as a sheet feeding roller in a copying machine, facsimile, printer and the like, wherein when the driving force is transmitted, the driving force from an input side is transmitted to an output side without loss. Further, when the driving force is not transmitted, an input side rotor of the clutch device rotates idly while causing friction as less as possible.

Further objects and advantages of the invention will be apparent from the following description of the invention.

SUMMARY OF THE INVENTION

In order to attain the above objects, according to the first aspect of the invention, a driving force transmitting clutch device transmits a driving force to a transmitted member such as a sheet feeding roller in a copying machine, facsimile and printer. The clutch device includes a main shaft; an input side rotor rotatable around the main shaft; an output side rotor rotatable around the main shaft for transmitting the driving force to a member to be transmitted such as a sheet feeding roller; an inner sleeve member disposed between an input end of the input side rotor and an output end of the output side rotor for engaging the output side rotor in a state that the inner sleeve member moves only in an axial direction of the main shaft; an outer sleeve member disposed between the input end of the input side rotor and the output end of the output side rotor in a state that the inner sleeve member is received therein; a braking device for braking the outer sleeve member; a coil spring having one end fixed to the inner sleeve member and the other end fixed to the outer sleeve member for urging the inner sleeve member toward the input end of the input side rotor.

The inner sleeve member and the input side rotor are provided with main connecting portions so that the inner sleeve member engages the input side rotor through an urging force of the coil spring. The inner sleeve member disengages from the input side rotor when the inner sleeve member moves in a direction against the urging force. Further, the inner sleeve member and the outer sleeve member are provided with sub-connecting portions so that the outer sleeve member rotates when the inner sleeve member engages the input side rotor through the main connecting portions.

At least one of the sub-connecting portions of the inner sleeve member and the outer sleeve member is provided with a cam surface so that the inner sleeve member moves in a direction against the urging force when the braking device stops the outer sleeve member while the coil spring contracts a diameter thereof and is compressed or expanded in an axial direction.

An abutting surface facing the input end of the input side rotor is formed on the sub-connecting portion of the inner sleeve member. Also, an abutting surface facing the output end of the output side rotor is formed on the sub-connecting portion of the outer sleeve member. When the inner sleeve member is completely moved against the urging force, the abutting surfaces abut against each other through inertia of the inner sleeve member.

With the above structure, when the braking device does not stop the outer sleeve member from rotating, the clutch device is in an IN-state (driving force transmitting state).

More specifically, the main connecting portion of the inner sleeve member engages the main connecting portion of the input side rotor through the urging force of the coil spring. The inner sleeve member is assembled with the output side rotor to be movable only in an axial direction of the main shaft. Accordingly, the driving force on the input side rotor is transmitted to the output side rotor through the inner sleeve member to thereby rotate the output side rotor.

In the IN-state, the outer sleeve member also rotates around the main shaft along with the inner sleeve member through the sub-connecting portions of the inner sleeve member and the sub-connecting portion of the outer sleeve member.

When the braking device stops the outer sleeve member from rotating, the clutch device is in an OFF-state (the driving force is not transmitted).

More specifically, when the braking device stops the rotation of the outer sleeve member in the IN-state, the inner sleeve member is moved in a direction against the urging force, i.e. direction for releasing the engagement between the main connecting portion of the inner sleeve member and the main connecting portion of the input side rotor by the cam surfaces provided to both or one of the sub-connecting portions of the inner sleeve member and the sub-connecting portion of the outer sleeve member. When the engagement is released, the rotating force of the input side rotor is not transmitted to the output side rotor.

The inner sleeve member thus moved in the direction for releasing the engagement is slightly rotated further by the inertia. The abutting surface of the sub-connecting portion thereof is pressed against the abutting surface of the sub-connecting portion of the outer sleeve member. Thus, the main connecting portion of the inner sleeve member is not returned to a position to engage the main connecting portion of the input side rotor until the outer sleeve member is released. Therefore, in the OFF-state, the input side rotor rotates idly around the main shaft without load.

In a case that the coil spring is formed of a compression coil spring, the coil spring is compressed at the OFF-state. On the other hand, in a case that the coil spring is formed of a tension coil spring, the coil spring is elongated at the OFF-state.

When the outer sleeve member is released from the OFF-state, the clutch device returns to the IN-state.

More specifically, when the braking device releases the outer sleeve member from the OFF-state, the outer sleeve member is slightly rotated in the same direction as that in the IN-state by the restoring force of the coil spring with a contracted diameter in the OFF-state. The abutting surface of the sub-connecting portion of the inner sleeve member moves away from the abutting surface of the sub-connecting portion of the outer sleeve member. When both abutting surfaces do not contact with each other, the inner sleeve member is moved by the restoring force of the coil spring toward the input end of the input side rotor. Accordingly, the main connecting portion of the inner sleeve member engages the main connecting portion of the input side rotor again.

Thus, the output side rotor is again rotated by the rotation of the input side rotor through the inner sleeve member.

More specifically, according to the clutch device as described above, when the driving force does not need to be applied to the transmitted member, the input side rotor rotates without load, so that the clutch device does not apply the load to the driving motor for driving the input side rotor in the OFF-state. Also, in the OFF-state, it is possible to completely shut off the power to the output side rotor.

When the driving force is transmitted to the transmitted member, the rotating force is transmitted to the output side rotor without loss of the power through the engagement between the main connecting portion of the inner sleeve member and the main connecting portion of the input side rotor.

According to the second aspect of the invention, the driving force transmitting clutch device for the sheet feeding roller in the copying machine, facsimile, printer as described in the first aspect of the invention is provided with the braking device. The braking device includes a braking member and a connecting member. The braking member is provided with an engaging claw portion for engaging an outer periphery of the outer sleeve member, and a supporting point of a supporting member. The braking member also has a connecting portion of an urging device for positioning the braking member around the supporting point at a position where the engaging claw portion is always pressed against the outer periphery of the outer sleeve member.

The connecting member is attached to the braking member between the supporting point and the engaging claw portion for connecting the braking member and the supporting member in an elongated state. The connecting member is formed of shape memory metal alloy so that the connecting member returns to an original state before the connecting member is elongated when an electric current is conducted.

With the structure as described above, when the electric current is applied to the connecting member upon an input of a driving signal from the transmitted member, the connecting member is restored to the state before elongated to retreat the engaging claw portion of the braking member. Thus, the engagement between the outer sleeve member and the engaging claw portion is released, so that the outer sleeve member can rotate. In other words, it is possible to switch from the OFF-state to the IN-state.

When the driving force does not need to be transmitted to the transmitted member, the connecting member is elongated again upon turning off the electric current to the connecting member. The braking member is moved to a position where the engaging claw portion engages the outer periphery of the outer sleeve member by the urging force of the urging device to stop the rotation of the outer sleeve member again. In other words, it is possible to switch from the IN-state to the OFF-state.

With the braking member as described above, the braking device and the clutch device can be made compact and light as much as possible. It is also possible to reduce the electric power consumption of a copying machine and the like using the clutch device.

DETAILED DESCRIPTION OF PREFERRED EMBODIMENT

Figure 1:
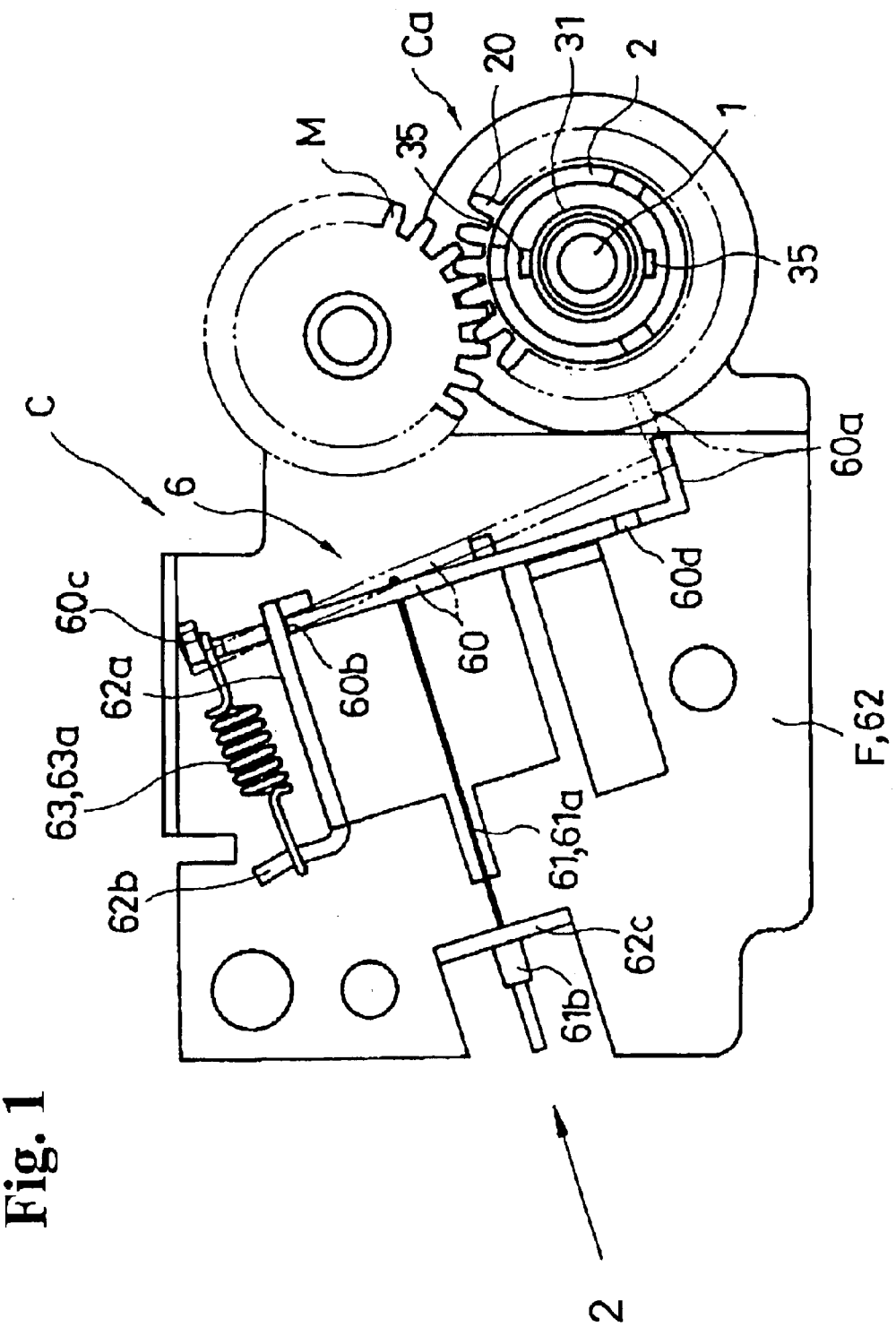
FIG. 1 is a side view of a clutch device.
Figure 2:
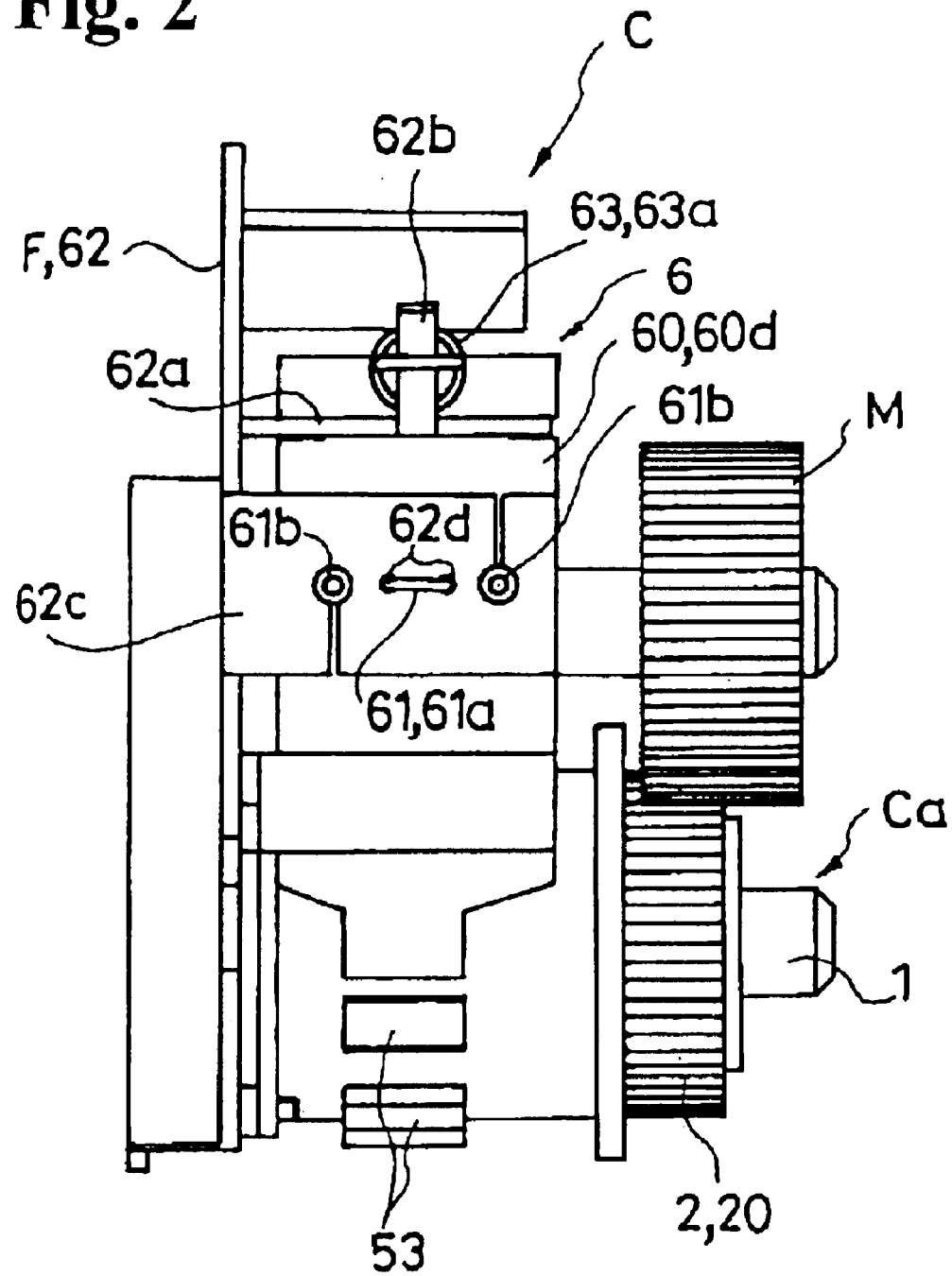
FIG. 2 is a side view of the clutch device viewed from an arrow direction 2 in FIG. 1.
Figure 3:
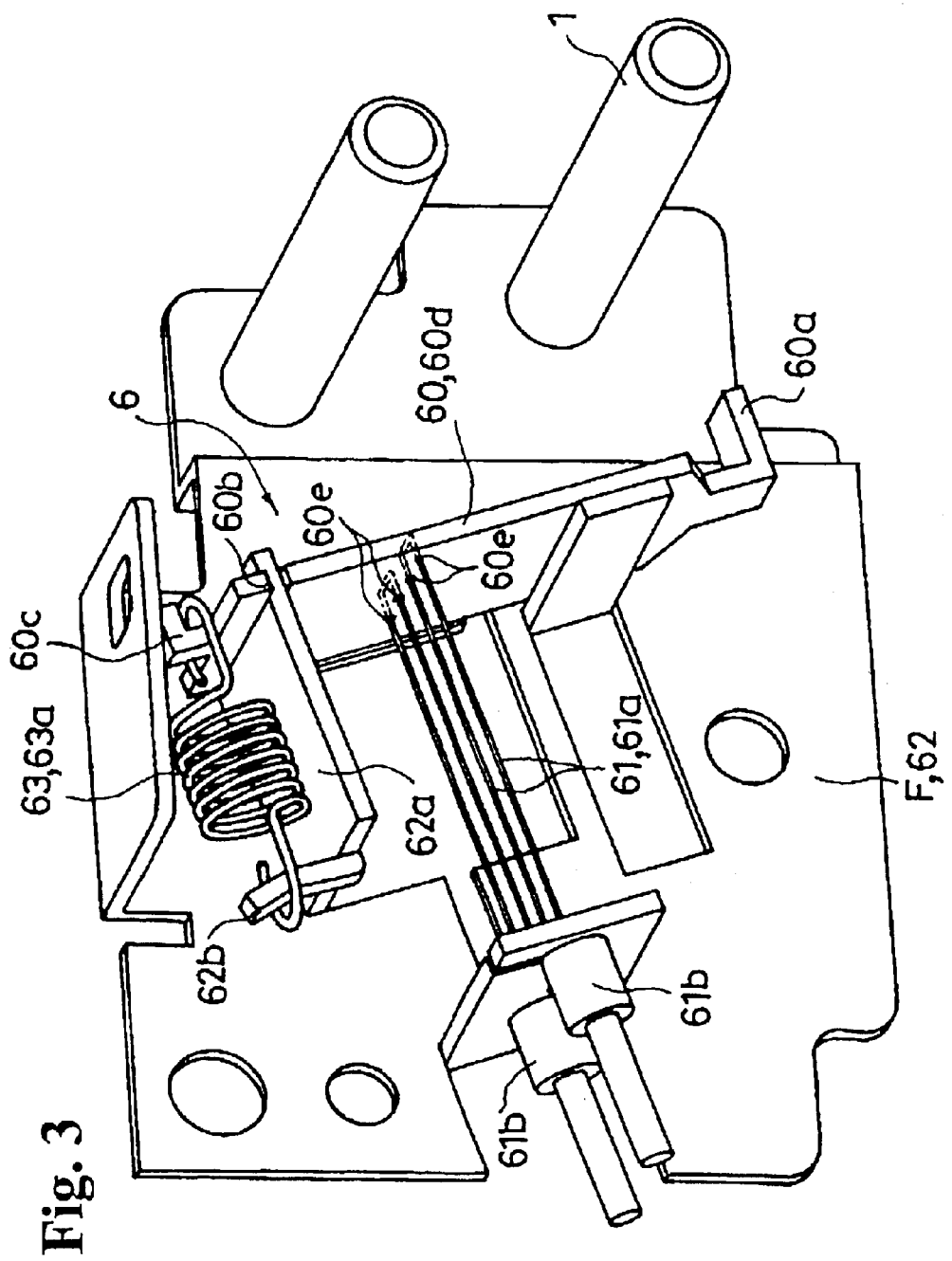
FIG. 3 is a perspective view of a braking device.
Figure 4:
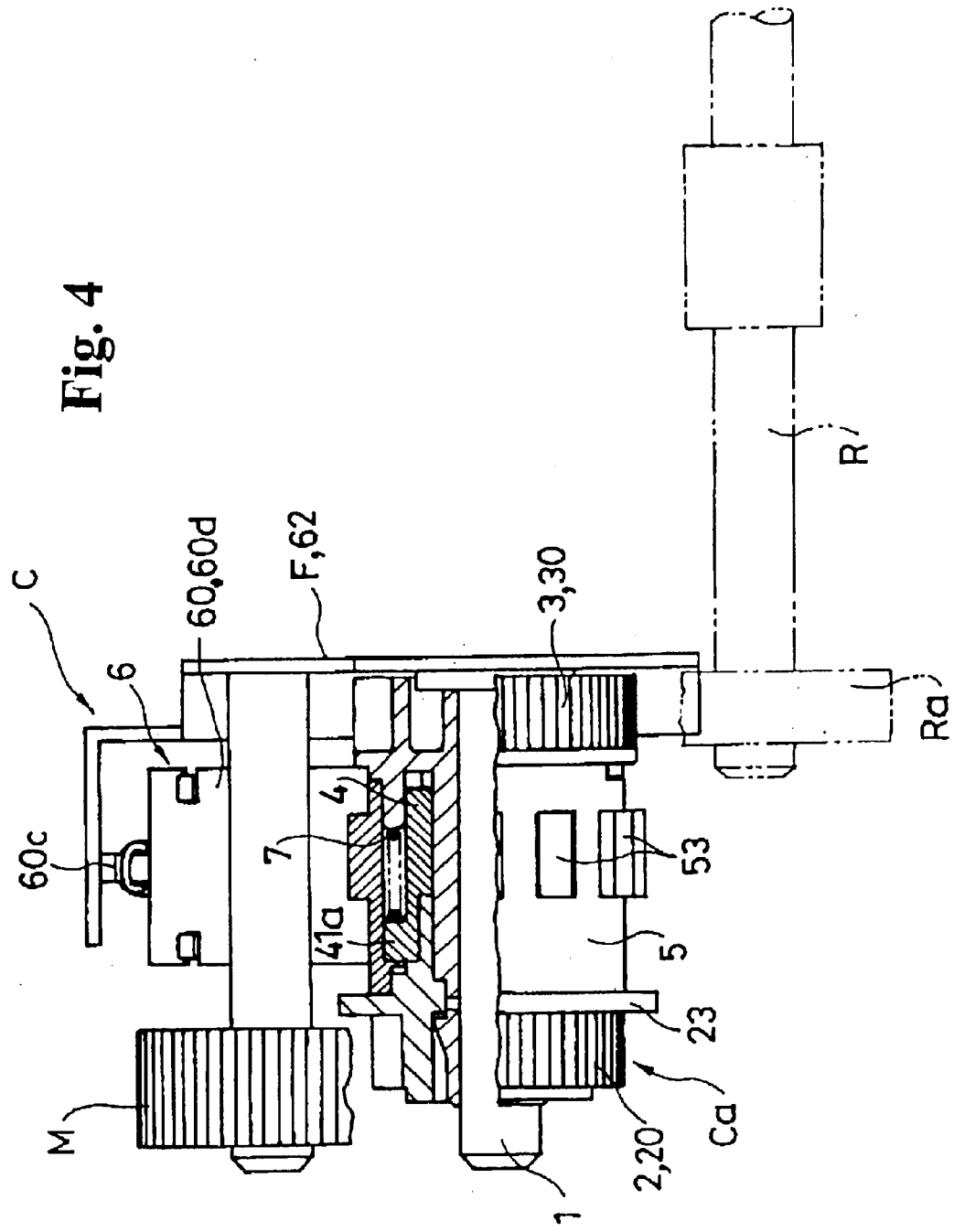
FIG. 4 is a side view showing a using state of the clutch viewed from the right side in FIG. 1.

Hereunder, embodiments of the present invention will be described with reference to FIG. 1 to FIG. 23. FIGS. 1, 2 and 4 show an entire structure of a clutch device C of the present embodiment, and FIG. 3 is a schematic view showing a structure of a braking device 6 constituting the clutch device C.

Figure 5:
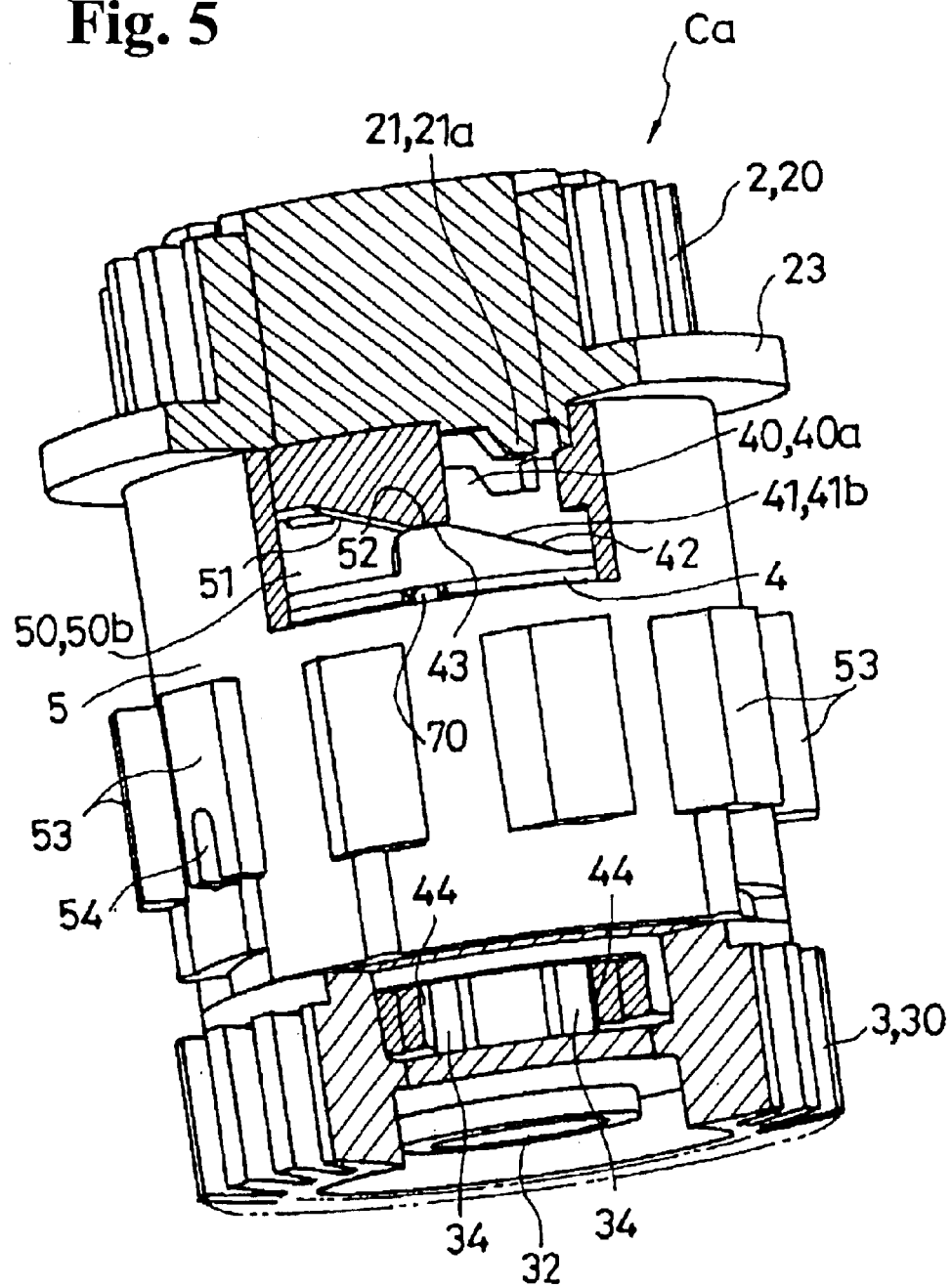
FIG. 5 is a partial sectional perspective view of an essential part of the clutch main portion in OFF-state.
Figure 6:
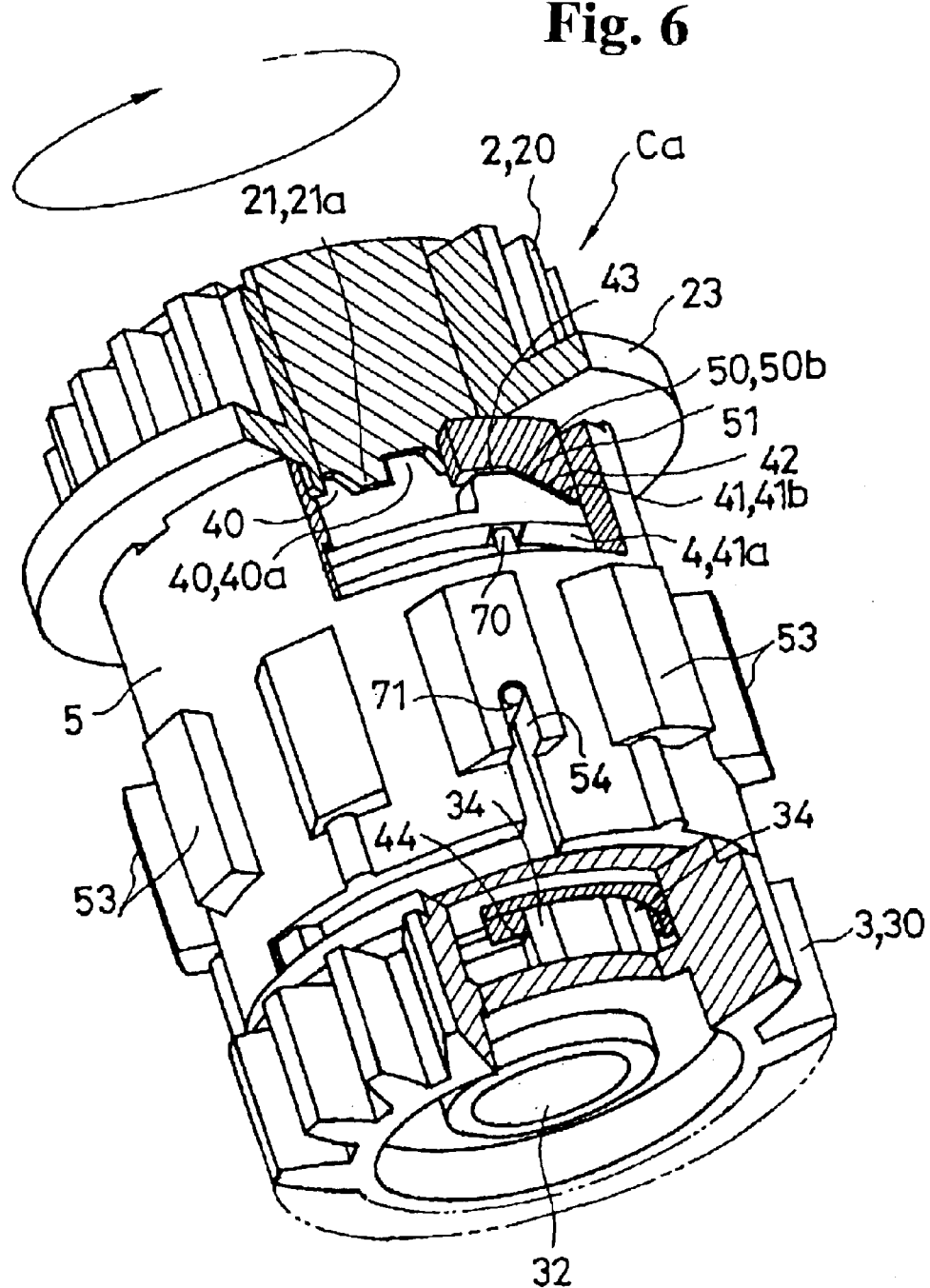
FIG. 6 is a partial sectional perspective view of an essential part of the clutch main portion in IN-state.

FIG. 5 shows a partial sectional view showing a clutch main portion Ca in an OFF-state (described later). FIG. 6 shows a partially broken clutch main portion Ca in an IN-state (described later), wherein the clutch main portion Ca is rotated around a main shaft 1 as a whole in an arrow direction as shown in FIG. 6.

Figure 7:
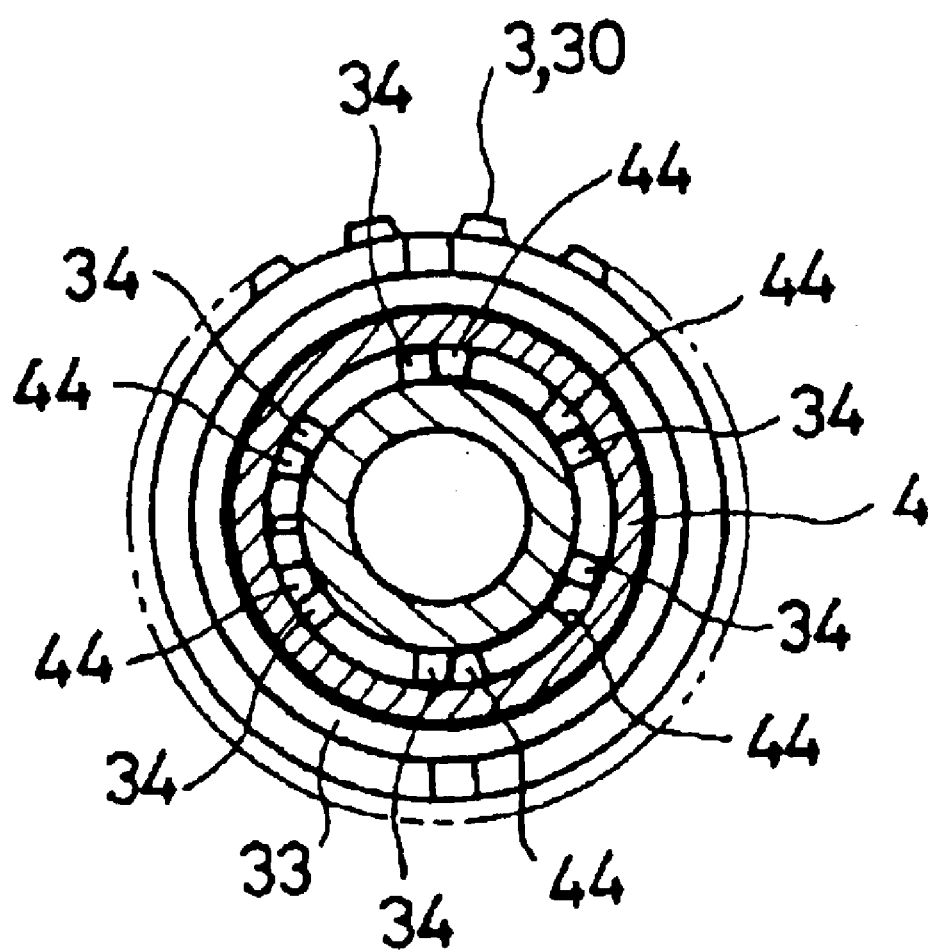
FIG. 7 is a sectional view of an engaging portion between an output side rotor and an inner sleeve member (only the inner sleeve member is shown by a sectional view)
Figure 8:
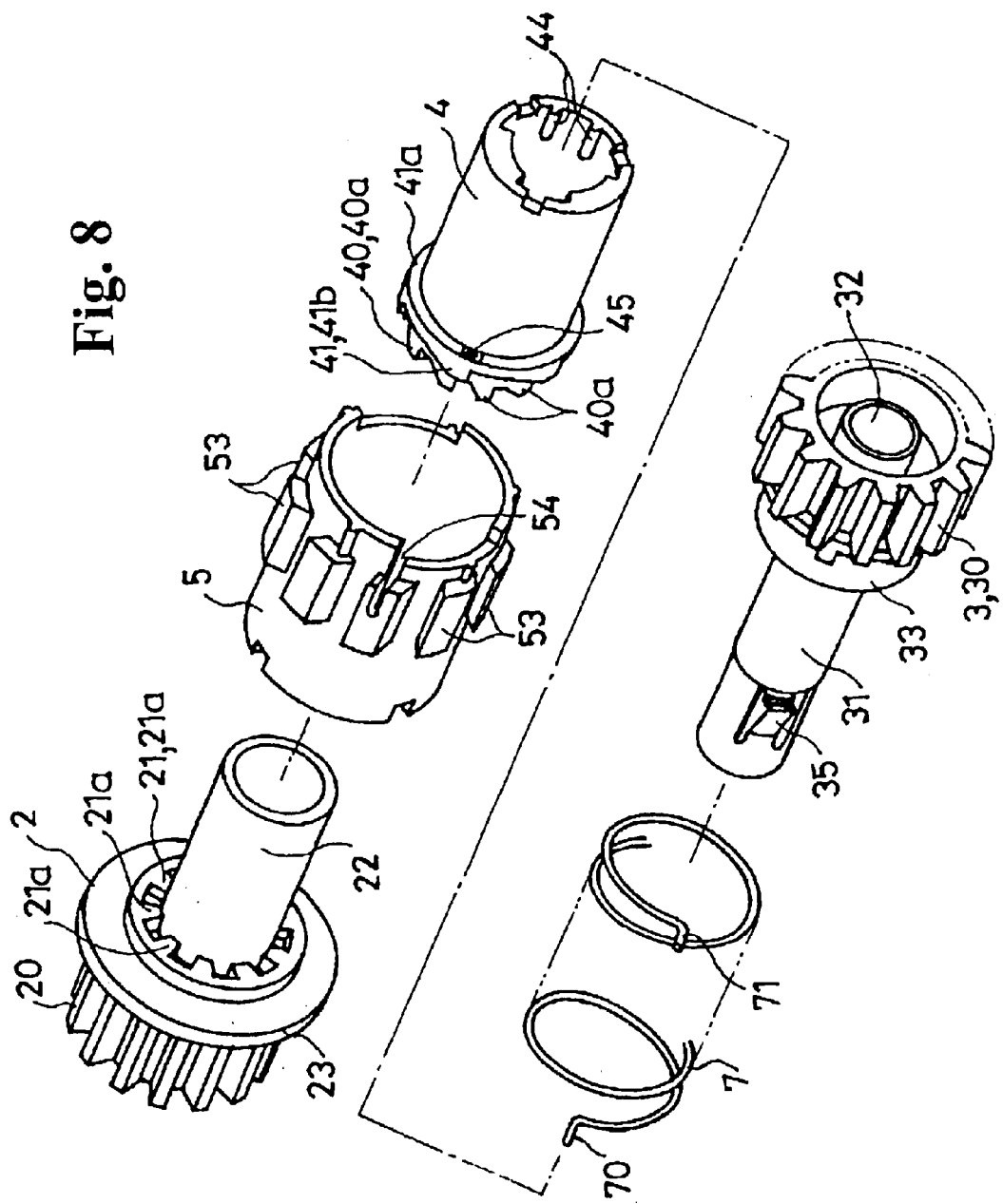
FIG. 8 is an exploded perspective view of the clutch main portion.
Figure 9:
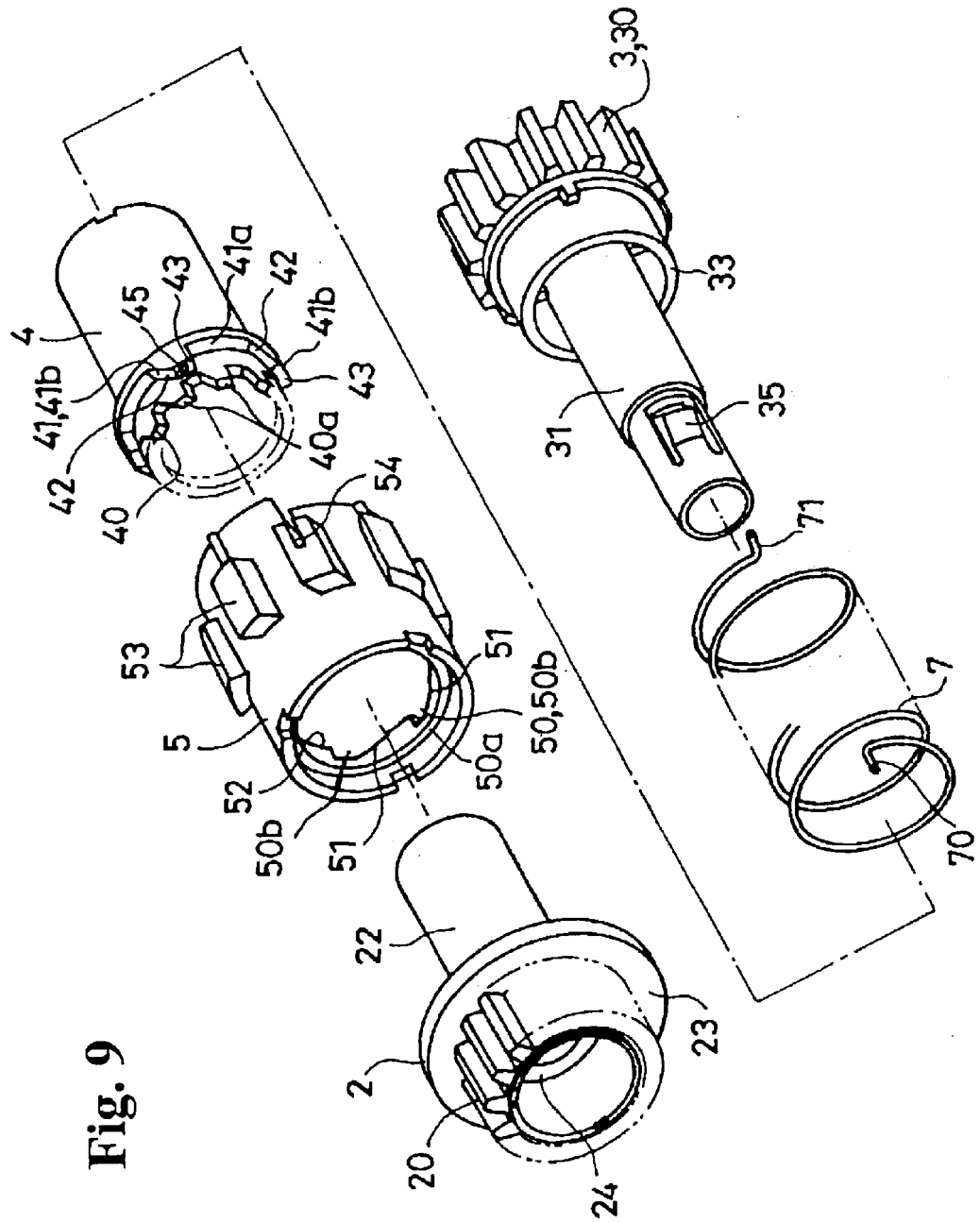
FIG. 9 is an exploded perspective view of the clutch main portion.
Figure 10:
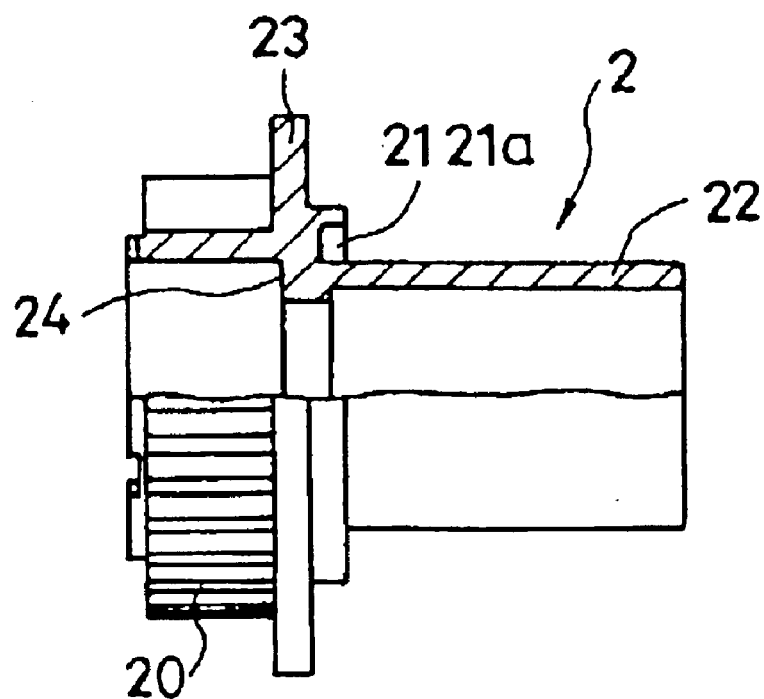
FIG. 10 is a partial sectional front view of an input side rotor.
Figure 11:
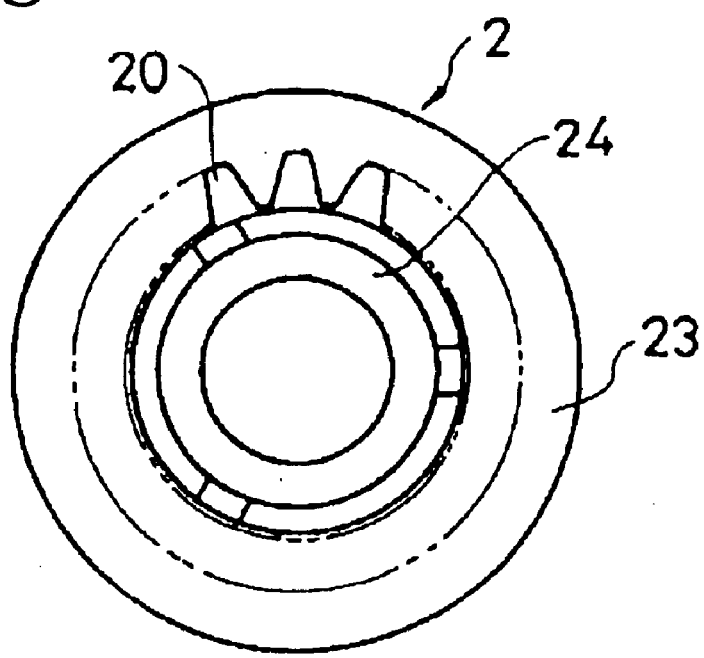
FIG. 11 is a left side view of the input side rotor.
Figure 12:
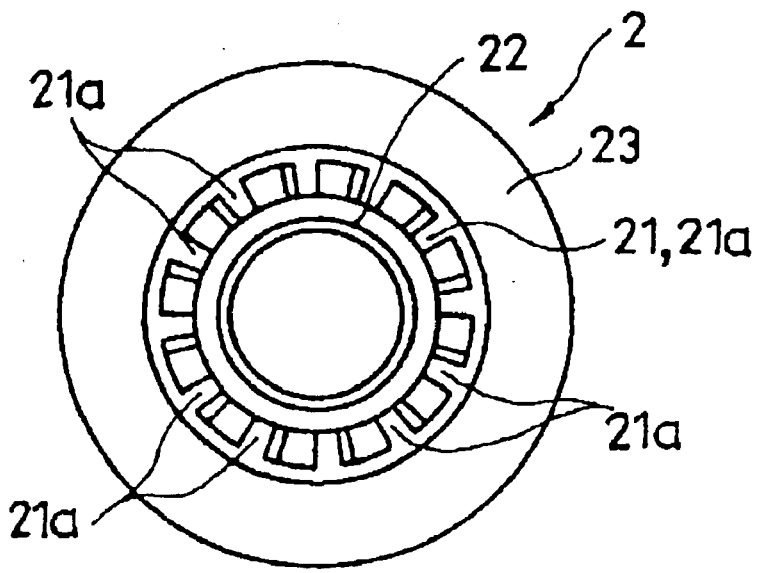
FIG. 12 is a right side view of the input side rotor.
Figure 13:
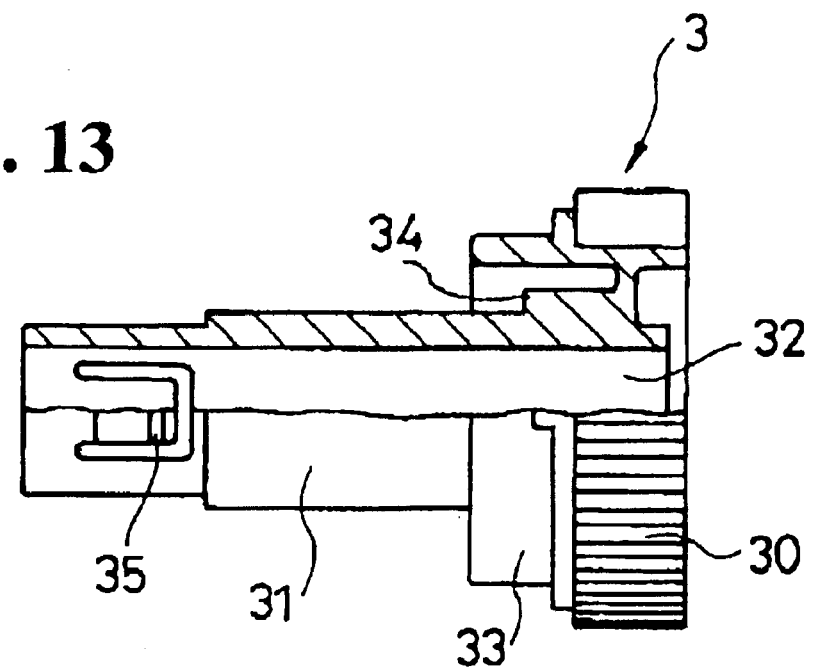
FIG. 13 is a partial sectional plan view of an essential part of the output side rotor.
Figure 14:
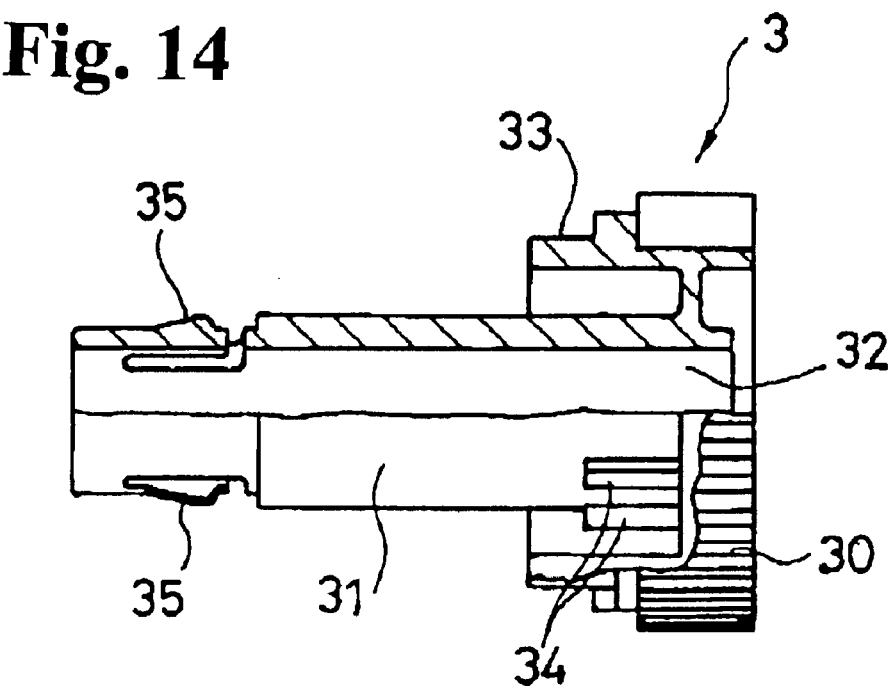
FIG. 14 is a partial sectional plan view of an essential part of the output side rotor.
Figure 15:
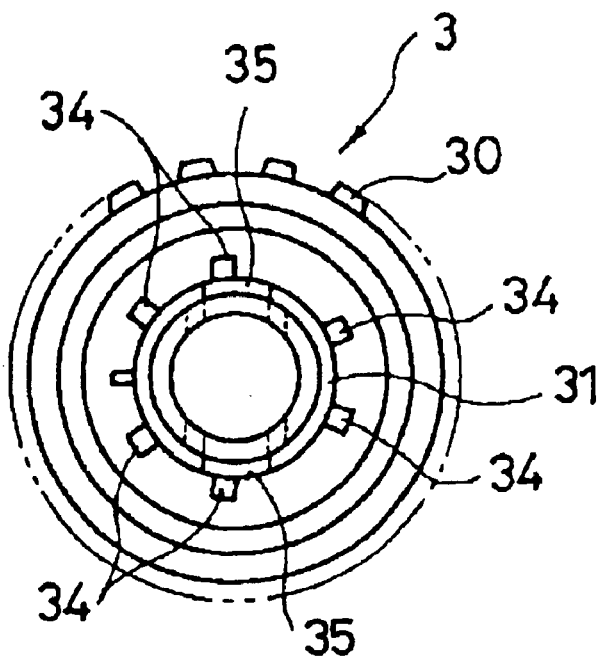
FIG. 15 is a left side view of the output side rotor.
Figure 16:
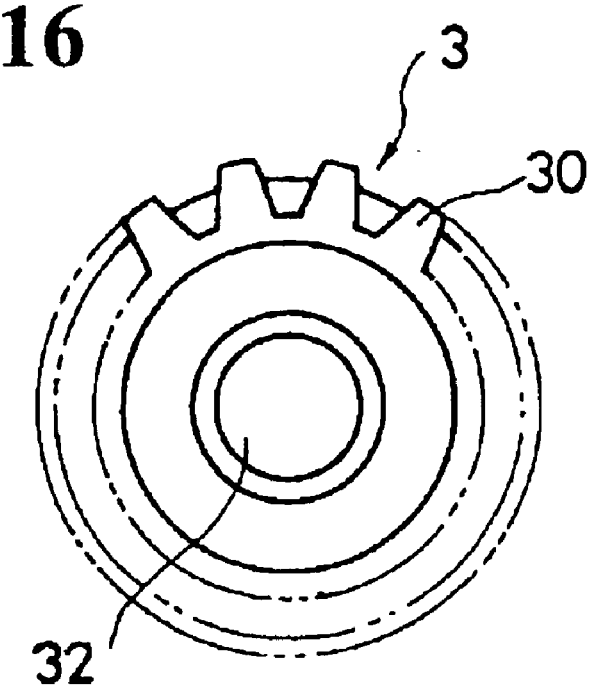
FIG. 16 is a right side view of the output side rotor.
Figure 17:
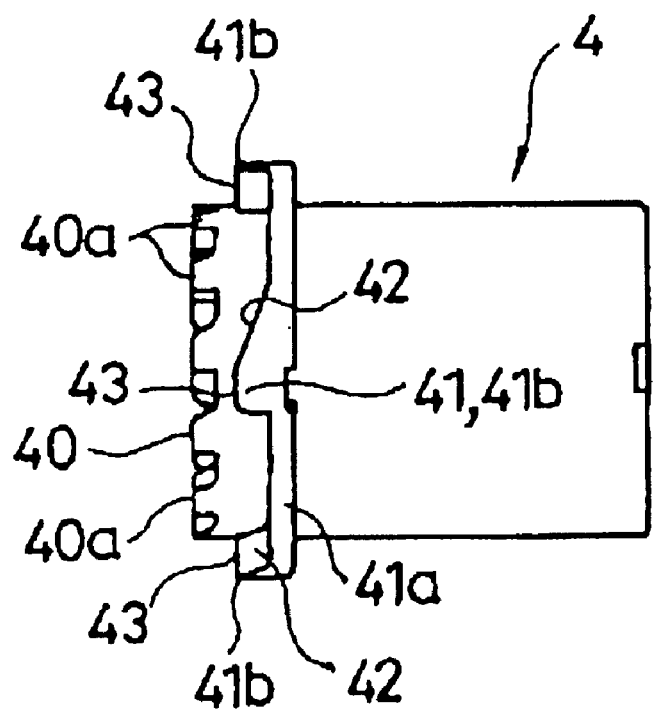
FIG. 17 is a front view of an inner sleeve member.
Figure 18:
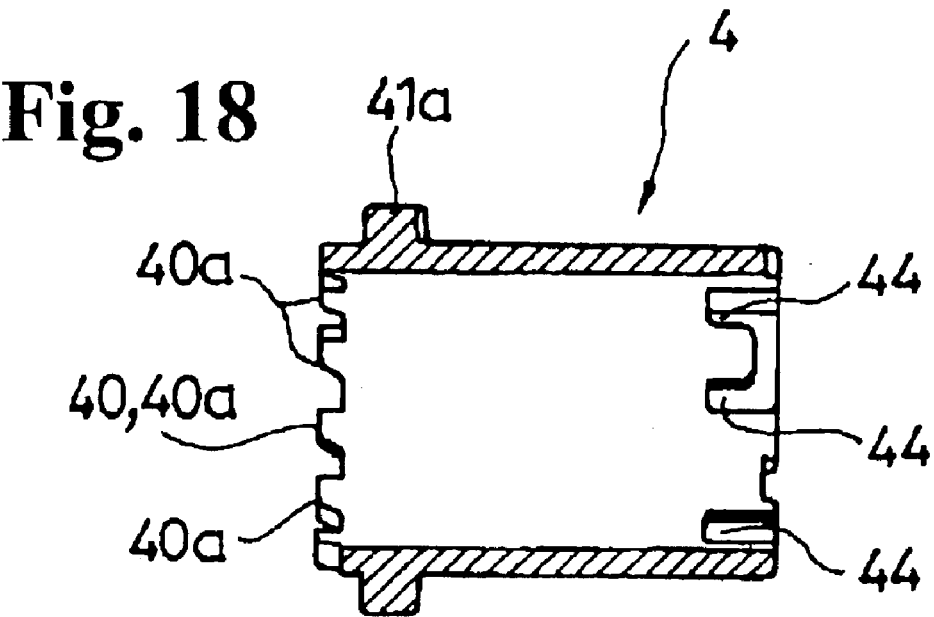
FIG. 18 is a sectional view of the inner sleeve member.
Figure 19:
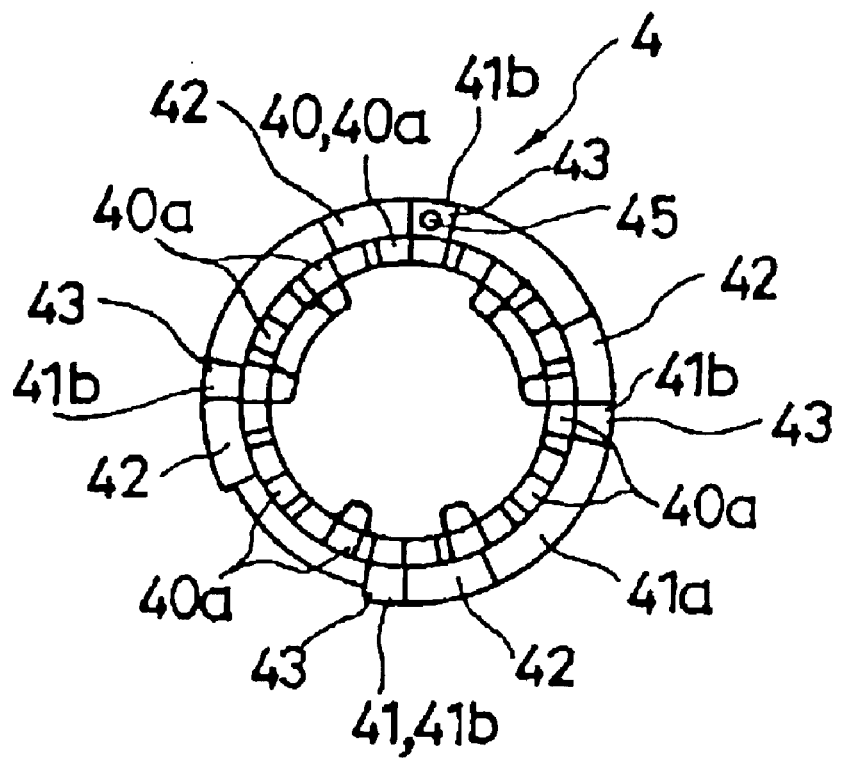
FIG. 19 is a left side view of the inner sleeve member.
Figure 20:
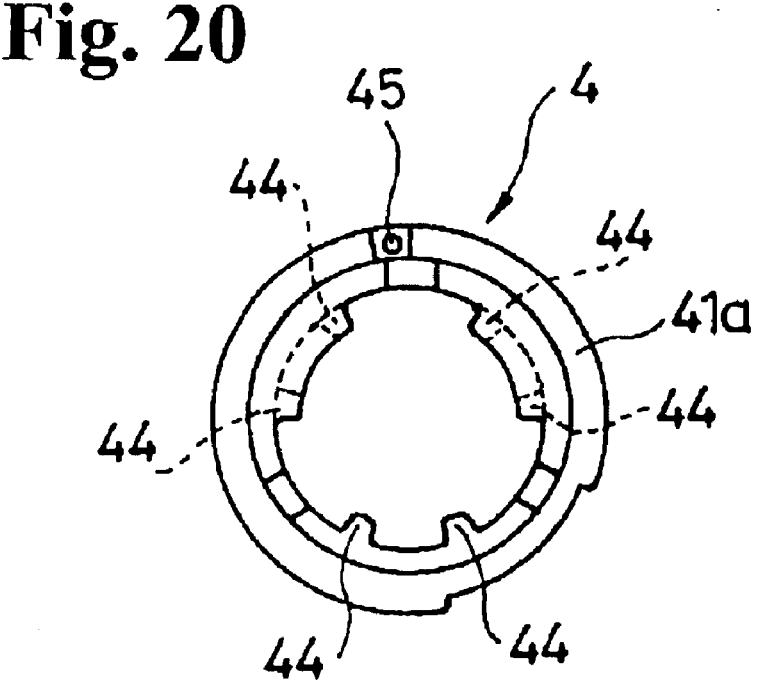
FIG. 20 is a right side view of the inner sleeve member.
Figure 21:
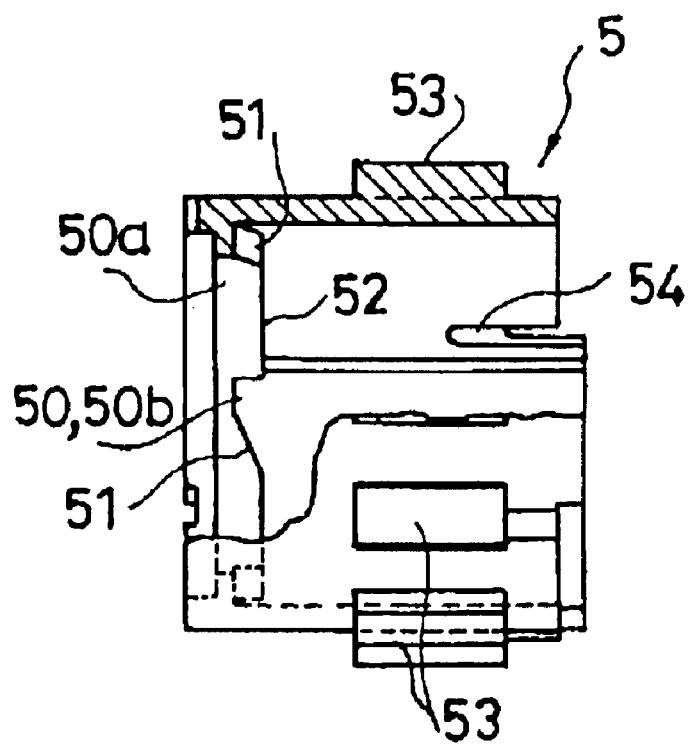
FIG. 21 is a partial sectional front view of an essential part of an outer sleeve member.
Figure 22:
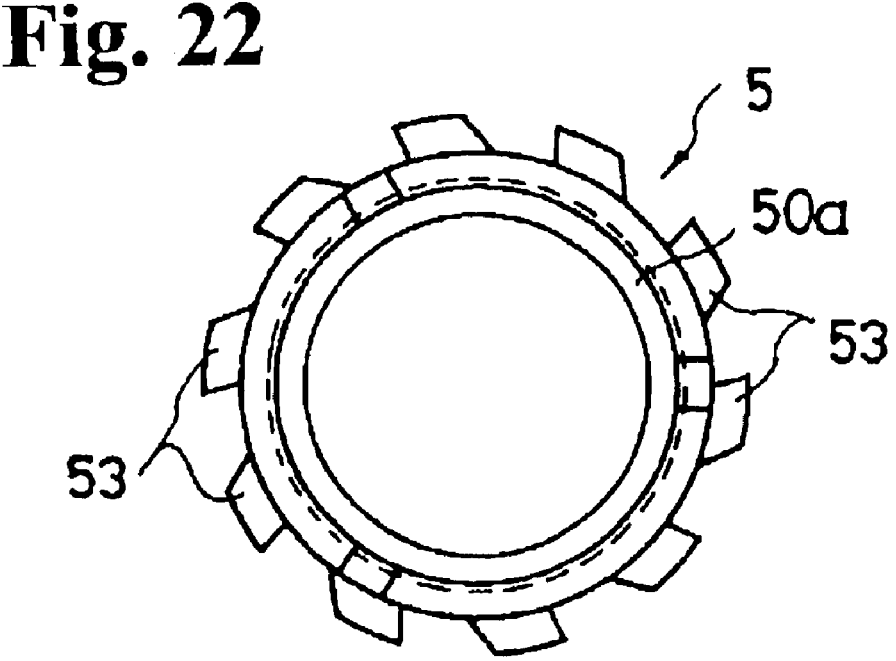
FIG. 22 is a left side view of the outer sleeve member.
Figure 23:
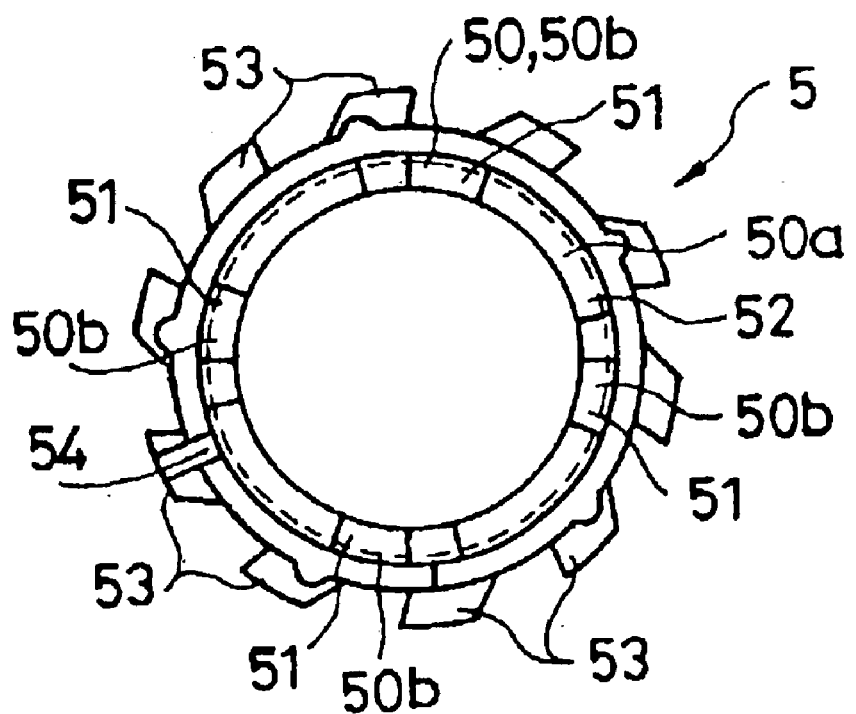
FIG. 23 is a right side view of the outer sleeve member.

FIG. 7 shows engaging portions of an output side rotor 3 and an inner side sleeve member 4 constituting the clutch main portion Ca. FIGS. 8 and 9 show an exploded view of a clutch main portion Ca; FIGS. 10 to 12 show an input side rotor 2; FIG. 13 to 16 show an output side rotor 3; FIGS. 17 to 20 show an inner sleeve member 4; and FIGS. 21 to 23 show an outer sleeve member 5, respectively.

A clutch C of the present embodiment is disposed between a gear M on a driving motor side and a gear Ra on a transmitted member R side so that the driving force is transmitted to a transmitted member R such as a sheet feeding roller in a copying machine, facsimile, printer and the like only when it is necessary.

Typically, in a case where a sheet feeding roller is taken as an example, the sheet feeding roller is disposed in a sheet supply tray or a transfer path of a sheet fed from the sheet supply tray. Accordingly, the clutch device C is also disposed at various positions in the copying machine or the like corresponding to the sheet feeding roller as described above.

The clutch device C is operated to transmit the driving force of the gear M at the driving motor side to the transmitted member R only when it is necessary. Hereunder, "IN-state" refers to a state where the clutch device transmits the driving force, and "OFF-state" refers to a state where the clutch device dose not transmit the driving force.

The clutch device C is formed of the main shaft 1, the input side rotor 2, the output side rotor 3, the inner sleeve member 4, the outer sleeve member 5, a braking device 6 and a coil spring 7.

The input side rotor 2 includes a gear portion 20 (input end) for engaging the gear M on the driving motor side. The input side rotor 2 rotates around the main shaft 1.

The output side rotor 3 includes a gear portion 30 (output end) for engaging the gear Ra on the transmitted member R side of the sheet feeding roller or the like. The output side rotor 3 rotates around the main shaft 1.

The inner sleeve member 4 is disposed between the gear portion 20 of the input side rotor 2 and the gear portion 30 of the output side rotor 3. The inner sleeve member 4 is assembled with the output side rotor 3 such that the inner sleeve member is movable only in an axis line direction of the main shaft 1. In other words, the inner sleeve member 4 is assembled to the input side rotor 2 while the main shaft 1 is situated inside the inner sleeve member 4.

The outer sleeve member 5 is disposed between the gear portion 20 of the input side rotor 2 and the gear portion 30 of the output side rotor 3 such that the inner sleeve member 4 is disposed inside the outer sleeve member. In other words, the inner sleeve member 4 is movable as described above inside the outer sleeve member 5.

The coil spring 7 is disposed between the inner sleeve member 4 and the outer sleeve member 5 and is wound around the inner sleeve member 4. The coil spring 7 constantly urges the inner sleeve member 4 toward the gear portion 20 side of the input side rotor 2. One end 70 of the coil spring is fixed to the inner sleeve member 4 and the other end 71 thereof is fixed to the outer sleeve member 5. In other words, the coil spring 7 extends between the inner sleeve member 4 and the outer sleeve member 5 and is wound around the inner sleeve member 4.

The inner sleeve member 4 and the input side rotor 2 are provided with main connecting portions 40 and 21, respectively. The inner sleeve member 4 engages the input side rotor 2 by the urging force of the coil spring. The inner sleeve member 4 disengages from the input side rotor 2 when the inner sleeve member 4 moves in a direction against the urging force.

The inner sleeve member 4 and the outer sleeve member 5 are provided with sub-connecting portions 41, 50, respectively. The outer sleeve member 5 rotates along with the inner sleeve member 4 when the input side rotor 2 rotates in a state that the main connecting portion 21 of the input side rotor 2 engages the main connecting portion 40 of the inner sleeve member 4.

The sub-connecting portion 41 of the inner sleeve member 4 and/or the sub-connecting portion 50 of the outer sleeve member 5 are provided with cam surfaces 42 and/or 51 for moving the inner sleeve member 4 in a direction against the urging force when the braking device 6 stops the outer sleeve member 5, while the coil spring 7 is reducing a diameter thereof and compressing or extending in an axis line direction thereof.

An abutting surface 43 facing the gear portion 20 of the input side rotor 2 is formed in the sub-connecting portion 41 of the inner sleeve member 4. An abutting surface 52 facing the gear portion 30 of the output side rotor 3 is formed in the sub-connecting portion 50 of the outer sleeve member 5. The abutting surface 43 contacts the abutting surface 52 through inertia of the inner sleeve member when the inner sleeve member 4 is completely moved against the urging force. In other words, after being completely moved against the urging force, the inner sleeve member 4 is slightly rotated through the inertia after the inner sleeve member 4 is released from the input side rotor 2. Accordingly, the abutting surface 43 abuts against the abutting surface 52 by the urging force of the coil spring 7.

According to the clutch device C of the present embodiment, the clutch C is in the IN-state when the outer sleeve member 5 rotates along with the inner sleeve member 4 (Refer to FIG. 6).

More specifically, the main connecting portion 40 of the inner sleeve member 4 engages the main connecting portion 21 of the input side rotor 2 by the urging force of the coil spring 7. The inner sleeve member 4 is assembled to the output side rotor 3 to be movable only in the axis line direction of the main shaft 1. As the gear portion 20 engages the gear M on the driving motor side, the rotating force is transmitted from the input side rotor 2 to the output side rotor 3 through the inner sleeve member 4. Then, the driving force is transmitted to the transmitted member R through the gear Ra on the transmitted member R side engaging the gear portion 30 of the output side rotor 3. In a case where the transmitted member R is, for example, a sheet feeding roller, the sheet feeding roller is rotated to thereby feed a sheet of paper.

In the IN-state, the sub-connecting portion 41 of the inner sleeve member 4 engages the sub-connecting portion 50 of the outer sleeve member 5. Accordingly, the outer sleeve member 5 also rotates around the main shaft 1 along with the inner sleeve member 4 and the output side rotor 3.

When the braking device 6 stops the outer sleeve member 5 from rotation, the clutch device C is in the OFF-state. (Refer to FIG. 5)

More specifically, when the braking device 6 stops the rotation of the outer sleeve member 5 in the IN-state, the inner sleeve member 4 is moved in a direction against the urging force. Thus, the main connecting portion 40 of the inner sleeve member 4 is released from the main connecting portion 21 of the input side rotor 2 by the cam surfaces 42, 51 provided on the sub-connecting portion 41 of the inner sleeve member 4 and the sub-connecting portion 50 of the outer sleeve member 5. When the engagement is released as described above, the rotating force of the input side rotor 2 is not transmitted to the output side rotor 3. For example, when the transmitted member R is the sheet feeding roller, the rotation of the sheet feeding roller is stopped.

After the inner sleeve member 4 is completely pushed in the direction of releasing the engagement as described above, the inner sleeve member is slightly rotated by the inertia. Accordingly, the abutting surface 43 of the sub-connecting portion 41 abuts against the abutting surface 52 of the sub-connecting portion 50 of the outer sleeve member 5. Therefore, until the outer sleeve member 5 is released, the inner sleeve member 4 does not return to a position where the main connecting portion 40 of the inner sleeve member 4 engages the main connecting portion 21 of the input side rotor 2. As a result, in the OFF-state, the input side rotor 2 rotates idly around the main shaft 1 without load.

When the braking device 6 releases the outer sleeve member 5, the clutch device C switches from the OFF-state to the IN-state.

More specifically, when the braking device 6 releases the outer sleeve member 5 from the OFF-state, the outer sleeve member 5 is slightly rotated in the same direction as the rotating direction in the IN-state by the restoring force of the coil spring 7 whose diameter is reduced in the OFF-state. Accordingly, the abutting surface 43 of the sub-connecting portion 41 of the inner sleeve member 4 moves away from the abutting surface 52 of the sub-connecting portion 50 of the outer sleeve member 5. As described above, when the both abutting surfaces 43, 52 are returned to the state where they do not abut against each other, the inner sleeve member 4 is moved toward the gear portion 20 of the input side rotor 2 by the restoring force of the coil spring 7. As a result, the main connecting portion 40 of the inner sleeve member 4 engages the main connecting portion 21 of the input side rotor 2 again (Refer to FIG. 6).

The input side rotor 2 drives to rotate the output side rotor 3 again through the inner side sleeve member 4, and the driving force is transmitted to the transmitted member R through the gear Ra on the transmitted member R side. In a case where the transmitted member R is the sheet feeding roller, the sheet feeding roller becomes the IN-state for feeding the sheet of paper again.

As described above, according to the clutch device C of the present embodiment, when the driving force does not need to be transmitted to the transmitted member R, the input side rotor 2 rotates without load. Therefore, the clutch device C does not apply the load to the driving motor in the OFF-state. Also, in the OFF-state, it is possible to completely shut off the driving force to the output side rotor 3.

When the driving force is transmitted to the transmitted member R, the main connecting portion 40 of the inner sleeve member 4 engages the main connecting portion 21 of the input side rotor 2, so that the driving force is transmitted to the output side rotor 3 without power loss.

The braking device 6 is provided with a mechanism for stopping the outer sleeve member 5 when the driving force does not need to be transmitted to the transmitted member R. For example, in a case where the transmitted member R is the sheet feeding roller, the braking device stops the outer sleeve member when a sheet of paper does not need to be fed. The braking device 6 may have any configurations as long as the device is provided with such a mechanism.

The braking device 6 may be provided with an engaging arm for engaging the outer sleeve member 5 or sandwiching the outer sleeve member 5 to stop the outer sleeve member 5 from rotating. An electromagnet is excited to release the engaging arm from the outer sleeve member based on a signal input when a sheet of paper is fed to a copying machine.

In the present embodiment, the braking device 6 includes a braking member 60 and a connecting member 61. The braking member 60 is provided with an engaging claw portion 60a for engaging an outer periphery of the outer sleeve member 5, and a supporting point 60b of a supporting member 60. The braking member 60 also has a connecting portion 60c of an urging device 63 for positioning the braking member 60 around the supporting point 60b at a position where the engaging claw portion 60a is always pressed against the outer periphery of the outer sleeve member 5.

The connecting member 61 is attached to the braking member 60 between the supporting point 60b and the engaging claw portion 60a for connecting the braking member 60 and the supporting member 62 in an expanded state. The connecting member 61 is formed of a shape memory metal alloy so that the connecting member 61 returns to an original state before the connecting member 61 is expanded when an electric current is conducted.

According to the braking device 6 as described above, when the electric current is applied to the connecting member 61 upon input of the driving signal from the transmitted member R, the connecting member 61 returns to the state before it is extended to retract the engaging claw portion 60a of the braking member 60. Accordingly, the engaging claw portion 60a is released from the outer sleeve member 5, so that the outer sleeve member 5 can rotate (Refer to a solid line in FIG. 1), thereby switching from the OFF-state to the IN-state.

When the driving force does not need to be transmitted to the transmitted member R, the connecting member 61 is extended by turning off the electricity to the connecting member 61, so that the braking member 60 is moved to a position where the engaging claw portion 60a engages the outer periphery of the outer sleeve member 5 to thereby stop the outer sleeve member 5 (position shown by a phantom line in FIG. 1). In other words, it is possible to switch from the IN-state to the OFF-state.

With the configuration of the braking device 6 described above, the braking device 6 and the clutch device C can be structured compact and light as much as possible. Also, the electric power consumption of the copying machine and the like employing the clutch device C can be reduced.

In the embodiment shown in the drawings, the main shaft 1, input side rotor 2, output side rotor 3, inner sleeve member 4, outer sleeve member 5, coil spring 7 and braking device 6 have specific structures as described hereunder, respectively.

In the embodiment as shown in the drawings, the main shaft 1 is formed of a round bar body with one end fixed to a frame F fixed to a main portion side, such as a copying machine. An end of the main shaft 1 is inserted into the inner side of the clutch member Ca from a side of the output side rotor 3, so that the clutch member Ca is attached to the main shaft 1. The clutch member Ca includes the output side rotor 3, inner sleeve member 4, outer sleeve member 5, input side rotor 2 and coil spring 7. The clutch main portion Ca is assembled to the main shaft 1 to be rotatable as a whole around the main shaft 1.

The gear M on the driving motor side is arranged above the main shaft 1, and engages the gear portion 20 of the input side rotor 2 to thereby rotate the input side rotor 2 even in the OFF-state.

In the IN-state, the input side rotor 2 engages the gear M on the driving motor side to rotate, and the main connecting portion 40 of the inner sleeve member 4 engages the input side rotor 2. Accordingly, the output side rotor 3 is rotated through the inner sleeve member 4. As a result, the driving force is transmitted to the transmitted member R through the gear Ra on the transmitted member R side engaging the gear portion 30 of the output side rotor 3.

In the embodiment as shown in the drawings, the braking device 6 is disposed at a side portion of the main shaft 1. The braking device 6 is provided with the braking member 60 for pressing the engaging claw portion 60a against the outer sleeve member 5 of the clutch main portion Ca supported on the main shaft 1 in a direction perpendicular to the axial direction of the main shaft 1.

The input side rotor 2 includes a cylindrical portion 22 with two opening ends; a flange portion 23 provided at one end of the cylindrical portion 22 and having a circular outer edge; and a gear portion 20 formed around one end of the cylindrical portion 22. One end surface of the gear portion 20 is integrally connected to a side surface of the one end of the cylindrical portion 22 at the flange portion 23. A teeth portion of the gear portion 20 is partitioned by grooves along an axis of the cylindrical portion 22.

The cylindrical portion 22 is structured to have an inner diameter so that a cylindrical portion 31 of the output side rotor 3 can be inserted from the other end of the cylindrical portion 22. The input side rotor 2 is rotated around the main shaft 1 in the state that the input side rotor 2 is axially supported on the cylindrical portion 31 of the output side rotor 3. Also, the cylindrical portion 22 is structured to have an outer diameter so that the cylindrical portion 22 can be inserted into the inner sleeve member 4.

The flange portion 23 is provided with the main connecting portion 21 of the input side rotor 2 at a side opposite to the side contacting the gear portion 20.

In the embodiment as shown in the drawings, the main connecting portion 21 of the input side rotor 2 is formed of a plurality of rib members 21a extending radially around an axis of the cylindrical portion 22. One end of each rib member 21a is integrally connected to a joining portion between the cylindrical portion 22 and the flange portion 23. The other end extends toward an outer edge of the flange portion 23 to be positioned on a part of an imaginary circle with a diameter smaller than that of the flange portion 23 concentric with the flange portion 23. A substantially same space is formed between the adjacent rib members 21a.

The output side rotor 3 includes a gear portion 30 with a tooth portion partitioned by grooves extending in the axial direction of the main shaft 1 and a cylindrical portion 31 with opening ends. The gear portion 30 and the cylindrical portion 31 are integrally connected.

The gear portion 30 includes a through-hole 32 passing through the rotational center. A periphery wall portion 33 surrounding the through-hole 32 is formed on one end surface of the gear portion 30 with a space from the through-hole 32.

In the embodiment as shown in the drawings, the output side rotor 3 is structured by integrally connecting one end of the cylindrical portion 31 to one end surface of the gear portion 30 in a state that the one end of the cylindrical portion 31 is inserted into the periphery-surrounding wall portion 33 so that the through-hole 32 of the gear portion 30 communicates with the interior of the cylindrical portion 31.

A plurality of rib portions 34 extending along the axis of the main shaft 1 is formed inside the periphery wall portion 33 at one end side of the cylindrical portion 31 thus integrated.

The through-hole 32 of the output side rotor 3 and the cylindrical portion 31 are structured to have an inner diameter capable of housing the main shaft 1 therein. In the embodiment as shown in the drawings, the clutch main portion Ca is assembled to the main shaft 1 so as to be rotatable around the main shaft 1 by inserting the main shaft 1 into the cylindrical portion 31 through the through-hole 32 of the output side rotor 3.

Rib portions 44 extending along the axis of the main shaft 1 are formed on an inner surface of the inner sleeve member 4 at an end side opposite to the side provided with the main connecting portion 40. The rib portions 44 engage the rib portions 34 when the cylindrical portion 31 of the output side rotor 3 is inserted into the cylindrical portion 22 of the input side rotor 2 in a state that the cylindrical portion 22 of the input side rotor 2 is inserted into the inner sleeve member 4. Through the engagement of the rib members or portions 34, 44, the inner sleeve member 4 is assembled with the output side rotor 3 in a state that the inner sleeve member 4 can be moved only in the axial direction of the cylindrical portion 31 of the output side rotor 3, i.e. in the axial direction of the main shaft 1 (Refer to FIG. 7).

Engaging portions 35 are formed in the cylindrical portion 31 of the output side rotor 3 at a side opposite to the side connected to the gear portion 30. The engaging portion 35 deforms elastically inwardly. As described above, the cylindrical portion 22 of the input side rotor 2 is inserted into the inner sleeve member 4. The coil spring 7 is wound around the outer side of the inner sleeve member 4 assembled to the outer side of the cylindrical portion 22 of the input side rotor 2. The inner sleeve member 4 is then inserted into the outer sleeve member 5. In this state, the cylindrical portion 22 of the input side rotor 2 is inserted into the cylindrical portion 31 of the output side rotor 3. As a result, the engaging portions 35 engage an engagement step surface 24 formed as a step between the cylindrical portion 22 of the input side rotor 2 and the gear portion 20 at an inner side of the gear portion 20 of the input side rotor 2. Thus, the clutch main portion Ca is assembled.

The inner side sleeve member 4 has a cylindrical shape with opening ends. The rib portions 44 are formed on the inner surface of the inner sleeve member 4 at one end thereof. The main connecting portion 40 and the sub-connecting portion 41 are formed at the other end of the inner sleeve member 4.

In the embodiment as shown in the drawings, the main connecting portion 40 of the inner sleeve member 4 is formed of a plurality of projections 40a disposed at the other end of the inner sleeve member 4. The respective projections 40a are formed to project outward along the axis of the inner sleeve member 4 with a substantially equal space between the adjacent projections 40a. In the IN-state, the coil spring 7 urges the inner sleeve member 4 so that the projections 40a enter concave portions formed between the adjacent rib members 21a of the main connecting portion 21 of the input side rotor 2, thereby connecting the inner sleeve member 4 to the input side rotor 2. The inner sleeve member 4 is assembled to the output side rotor 3 so that the inner sleeve member 4 can be moved only in the axial direction of the main shaft 1 through the engagement between the rib portions 44 of the inner sleeve member 4 and the rib portions 34 of the output side rotor 3. Accordingly, the output side rotor 3 rotates along with the input side rotor 2 through the inner sleeve member 4 in the IN-state.

An outer flange portion 41a is formed at the other side of the inner sleeve member 4 with a space from the other end. The sub-connecting portion 41 of the inner sleeve member 4 is formed on the outer flange portion 41a at a surface portion facing the other end. The sub-connecting portion 41 is formed of a plurality of projections 41b projecting from the surface portion of the outer flange portion 41a toward the other end of the inner sleeve member 4.

The respective projections 41b are arranged with a substantially equal space between the adjacent projections 41b. The projection 41b has a cam surface 42 at a side surface facing a forward side in the rotational direction of the clutch main portion Ca. The cam surface is gradually inclined toward a rear side in the rotational direction to a top portion of the projection 41b.

The top portion of each projection 41b is formed of a surface substantially perpendicular to the axis of the main shaft 1. The surface of the top portion functions as an abutting surface 43 for maintaining the OFF-state. Specifically, the top portion of each projection 41b, i.e. the abutting surface 43, is located at a position lower than a base portion of the projection 40a of the main connecting portion 40 of the inner sleeve member 4.

The outer sleeve member 5 is formed in a cylindrical shape with opening ends. The outer sleeve member 5 has an inner diameter so that the inner sleeve member 4 provided with the coil spring 7 wound around the outer side thereof is received in the outer sleeve member 5 from one end thereof. In that state, the inner sleeve member 4 can be moved in a rotational direction in the outer sleeve member 5, and the coil spring 7 can be compressed and contracted in a way of reducing its diameter.

The outer sleeve member 5 is provided with the sub-connecting portion 50 at the other end. In the embodiment as shown in the figures, an inner flange portion 50a is formed in an inner surface portion of the outer sleeve member 5. The sub-connecting portion 50 of the outer sleeve member 5 is formed on the inner flange portion 50a at a surface portion thereof facing the one end of the outer sleeve member 5.

Specifically, the sub-connecting portion 50 of the outer sleeve member 5 is formed of a plurality of concave portions 50b provided on the surface portion of the inner flange portion 50a. The respective concave portions 50b have a substantially equal space between the adjacent concave portions 50b.

The concave portion 50b is provided with a cam surface 51 at an inner surface thereof facing a rear side in the rotational direction of the clutch main portion Ca. The cam surface 51 is inclined to gradually approach a front side in the rotational direction of the clutch main portion Ca toward an entrance of the concave portion 50b.

The surface portion of the inner flange-like portion 50a between the adjacent concave portions 50b is perpendicular to the axis of the main shaft 1, so that the surface portion functions as the abutting surface 52 for maintaining the OFF-state.

The inner sleeve member 4 received in the outer sleeve member 5 is assembled to the outer sleeve member 5 in the IN-state. In that state, the respective projections 41b formed on the outer flange portion 41a are inserted into the corresponding concave portions 50b formed on the inner flange portion 50a of the outer sleeve member 5 by the urging force of the coil spring 7 from the gear portion 30 side of the output side rotor 3.

Specifically, in the IN-state, the projection 41b is completely inserted into the concave portion 50b in a state that the cam surface 42 of the projection constituting the sub-connecting portion 41 of the inner sleeve member 4 abuts against the cam surface 51 of the concave portion 50b constituting the sub-connecting portion 50 of the outer sleeve member 5 (Refer to FIG. 6).

A plurality of engaging ribs 53 extending along a rotational axis of the clutch main portion Ca, i.e. the axis of the main shaft 1, is formed on an outer surface of the outer sleeve member 5. In the embodiment as shown in the drawings, there is a substantially equal space between the adjacent engaging ribs 53 in the rotational direction of the main shaft 1. In the OFF-state, the engaging claw portion 60a of the braking member 60 constituting the braking device 6 engages one of the engaging ribs 53 to thereby prevent the outer sleeve member 5 from rotating.

In the IN-state, the coil spring 7 always urges the inner sleeve member 4 toward the gear portion 20 of the input side rotor 2, so that the main connecting portion 40 is connected to the main connecting portion 21 of the input side rotor 2. Therefore, in the IN-state, the inner sleeve member 4 rotates along with the input side rotor 2 in the same direction. Further, the output side rotor 3 is assembled to the inner sleeve member 4 in a state that the inner sleeve member 4 is movable only in the axial direction of the main shaft 1. In that state, the output side rotor 3 also rotates in the same direction as the inner sleeve member 4.

Also, in the IN-state, the projections 41b are inserted into the concave portions 50b, so that the inner sleeve member 4 is assembled to the outer sleeve member 5. Accordingly, the outer sleeve member 5 rotates in the same direction as in the inner sleeve member 4. In other words, in the IN-state, the clutch main portion Ca rotates around the main shaft 1 as a whole (Refer to FIG. 6).

In the IN-state, when the braking device 6 stops the outer sleeve member 5 from rotating, the cam surface 42 constituting the sub-connecting portion 41 of the inner sleeve member 4 is strongly pressed against the cam surface 51 of the concave portion 50b constituting the sub-connecting portion 50 of the stopped outer sleeve member 5. With the inclined surfaces of the cam surfaces 42, 51 pressed against each other, the inner sleeve member 4 compresses the coil spring 7. Also, the inner sleeve member 4 moves toward the output side rotor 3 against the urging force of the coil spring 7 while contracting the diameter of the coil spring 7 as the inner sleeve member rotates along the inclined surfaces of the cam surfaces 42, 51.

When the inner sleeve member 4 moves as described above, the respective projections 40a constituting the main connecting portion 40 of the inner sleeve member 4 move away from the respective rib members 21a constituting the main connecting portion 21 of the input side rotor 2, thereby releasing the connection therebetween.

After the projections 41b are extracted from the concave portions 50b, the inner sleeve member 4 is slightly rotated by the inertial while contracting the diameter of the coil spring 7. Then, the inner sleeve member 4 moves to a position where the abutting surface 43 of the inner sleeve member 4 abuts against the abutting surface 52 of the outer sleeve member 5 from the side of the gear portion 30 of the output side rotor 3. Accordingly, the OFF-state is maintained (Refer to FIG. 5).

In the OFF-state, when the braking device 6 releases the outer sleeve member 5, i.e. the engaging claw portion 60a of the braking member 60 is retreated so that the engaged rib 53 of the outer sleeve member 5 is disengaged from the engaging claw portion 60a of the braking member 60, the outer sleeve member 5 is slightly rotated in the same direction as that of the clutch main portion Ca in the IN-state by the elastic restoring force of the coil spring 7 with the contracted diameter as described above.

When the outer sleeve member 5 is rotated in this direction, the projection 41b is inserted into the concave portion 50b again. In the OFF-state, the inner sleeve member 4 moves toward the gear portion 20 of the input side rotor 2 to a position where the projection 41b is completely inserted into the concave portion 50b by the elastic restoring force of the compressed coil spring 7. Thus, the main connecting portions 21, 40 engage with each other to thereby return to the IN-state.

In the embodiment as shown in the drawings, a compression coil spring is used as the coil spring 7. The coil spring 7 is wound around the inner sleeve member 4 between the inner sleeve member 4 and the outer sleeve member 5 in a state where the diameter of the coil spring 7 is allowed to contract. In other words, the inner sleeve member 4 is inserted into the wound portion of the coil spring 7, and the inner sleeve member 4 with the wound portion of the coil spring 7 is inserted into the outer sleeve member 5.

One end 70 of the coil spring 7 is inserted into an eyelet 45 formed on the outer flange portion 41a of the inner sleeve member 4 from the gear portion 30 of the output side rotor 3. Thus, the one end 70 of the coil spring 7 is fixed to the inner sleeve member 4 in a state inserted therein. The other end 71 of the coil spring 7 is inserted into an expanding slot 54 opened outward at the end side of the outer sleeve member 5 opposite to the side provided with the inner flange-like portion 50a from a side of the gear portion 30 of the output side rotor 3. Thus, the other end 71 is hooked on the outer sleeve member 5.

Also, the other end 71 of the coil spring 7 abuts against a projection end of the periphery wall portion 33 of the output side rotor 3 so that the coil spring 7 is compressed. Accordingly, the coil spring 7 always urges the inner sleeve member 4 toward the input end of the input side rotor 2.

The diameter of the coil spring 7 is contracted by the rotation of the cam surfaces 42, 51 of the inner sleeve member 4 and the outer sleeve member 5 when the braking device 6 stops the outer sleeve member 5 and the outer sleeve member 5 rotates by the subsequent inertia.

In the embodiment as shown in the drawings, the braking member 6 includes the braking member 60 and the connecting member 61. A frame F is provided with the main shaft 1 and is fixed to a main portion side of a copying machine or the like. The braking member 60 is formed in a plate member 60d, and a back surface of the plate member 60a is supported on the supporting portion 62a formed in the frame F at a side of the main shaft 1. The frame F provided with the supporting portion 62a is a supporting member 62, and a portion of the plate member 60d supported on the supporting portion 62a becomes a supporting point 60b.

The engaging claw portion 60a projecting toward the main shaft 1 is formed at a lower end of the plate member 60d. A connecting portion 60c of an urging device 63 is formed at an upper portion of the supporting point 60b of the plate member 60d. The urging device 63 always urges the engaging claw portion 60a to rotate around the supporting point 60b toward the outer periphery of the outer sleeve member 5 of the clutch main portion Ca rotatably supported to the main shaft 1.

The urging device 63 is formed of a tensile coil spring 63a. One end of the tensile coil spring 63a is hooked on a hooking portion 62b disposed at a rear side of the supporting portion 62a. The other end of the spring 63a is hooked on a connecting portion 60c formed on an upper portion of the plate member 60d. Accordingly, the plate member 60d is always urged so that the engaging claw portion 60a is always pressed against the outer periphery of the outer sleeve member 5 around the supporting point 60b (hereinafter, the position shown by the phantom line in FIG. 1 is referred to as "advanced position of the plate member 60d").

When the plate member 60d is in the advanced position, the connecting member 61 connects the plate member 60d to the supporting member 62, i.e. the frame F, in an extended state at a location between the supporting point 60b of the braking member 60 and the engaging claw portion 60a. Also, the connecting member 61 is made of a shape memory alloy having electrical conductivity so that the connecting member 61 returns to the state before extended upon turning on electricity.

When the electricity is not conducted in the connecting member 61, the plate member 60d is at the advanced position to press the engaging claw portion 60a against the outer periphery of the outer sleeve member 5 to thereby stop the outer sleeve member 5. Specifically, the engaging claw portion 60a is hooked on one of the engaging ribs 53 disposed on the outer sleeve member 5 to stop the outer sleeve member 5. Thus, the OFF-state is maintained.

When the electricity is conducted in the connecting member 61, the connecting member 61 returns to a state before it is extended, i.e., contracted. Accordingly, the plate member 60d rotates around the supporting point 60b to retreat the engaging claw portion 60a against the urging force of the urging device 63. Thus, the engaging claw portion 60a is released from the engaging rib 53 formed on the outer sleeve member 5 to release the outer sleeve member 5. Thus, the OFF-state is switched to the IN-state.

When the electricity is stopped to change the connecting member 61 from the IN-state, the urging device 63 extends the connecting member 61, and the plate member 60d returns to the advanced position to switch to the OFF-state.

In the connecting member 61, a piece of wire rode 61a made of the shape memory alloy having the functions as described above is sequentially passed through four eyelets 62d formed in the supporting plate 62c disposed at the rear side of the plate member 60d and four eyelets 60e formed in the plate member 60d. Accordingly, the wire rod 61a is extended between the supporting plate 62c and the plate member 60d. Terminals 61b are press fitted to both ends of the wire rod 61a at the backside of the supporting plate 62c, so that the wire rod 61a is held in the extended state. The shape memory alloy having the function as described above includes titanium and nickel.

According to the clutch device of the present invention, when the driving force is transmitted, the driving force from the input side rotor can be transmitted to the output side rotor without loss by connecting the main connecting portion of the input side rotor and the main connecting portion of the inner sleeve member. When the driving force is not transmitted, the input side rotor rotates idly without resistance by moving the inner sleeve member so that the main connecting portion of the input side rotor is released from the main connecting portion of the inner sleeve member is released.

While the invention has been explained with reference to the specific embodiments of the invention, the explanation is illustrative and the invention is limited only by the appended claims.

What is claimed is:

1. A driving force transmitting clutch device for transmitting a driving force, comprising:
   a main shaft;
   a first rotor rotatable around the main shaft;
   a second rotor rotatable around the main shaft;
   an inner sleeve member disposed between the first and second rotors to be able to transmit a rotational force therebetween, and assembled with the second rotor to be movable in an axial direction of the main shaft;
   an outer sleeve member disposed between the first and second rotors, and receiving the inner sleeve member therein;
   a braking device for stopping the outer sleeve member; and
   a coil spring situated between and attached to the inner sleeve member and the outer sleeve member for urging the inner sleeve member toward the first rotor so that when the outer sleeve is stopped by the braking device, the outer sleeve moves the inner sleeve toward the second rotor for releasing the inner sleeve from the first rotor.

2. A driving force transmitting clutch device as claimed in claim 1, wherein said inner sleeve member and said first rotor include main connecting portions, said main connecting portions generally engaging the inner sleeve member with the first rotor by an urging force of the coil spring, and releasing the inner sleeve member from the first rotor when the inner sleeve member moves toward the second rotor due to stopping of the outer sleeve member by the braking device.

3. A driving force transmitting clutch device as claimed in claim 2, wherein said inner sleeve member and said outer sleeve member include sub-connecting portions, said sub-connecting portions engaging with each other when the main connecting portions engage each other so that the outer sleeve member rotates along a rotation of the inner sleeve member, at lease one of the sub-connecting portions having a cam surface for moving the inner sleeve member toward the second rotor while compressing the coil spring when the outer sleeve member is stopped by the braking device.

4. A driving force transmitting clutch device as claimed in claim 3, wherein said sub-connecting portions have abutting surfaces for contacting each other when the inner sleeve moves to an end in a direction to the second rotor.

5. A driving force transmitting clutch device as claimed in claim 1, wherein said braking device includes a braking member having a plate member with an engaging claw for engaging the outer sleeve member, a supporting member for supporting the plate member, and an urging device attached to the supporting member for urging the plate member so that the engaging claw engages the outer sleeve member; and a connecting member attached to the plate member for moving the same to engage or disengage the engaging claw with respect to the outer sleeve member.

6. A driving force transmitting clutch device as claimed in claim 5, wherein said connecting member is made of a shape memory alloy so that when an electricity is conducted in the connecting member, the connecting member is contracted to move the plate member to release the engaging claw from the outer sleeve member, and when the electricity is not conducted in the connecting member, the connecting member is elongated by the urging device.

7. A driving force transmitting clutch device as claimed in claim 1, wherein said first rotor is an input side of the clutch device, and said second rotor is an output side thereof.

* * * * *